Oct. 15, 1929.  J. M. GILBERT ET AL  1,731,567

WASHBASIN EQUIPMENT FOR AUTOMOBILES

Filed Feb. 15, 1928

Inventors:
Jesse M. Gilbert,
Mark E. Brookshire
by Hazard and Miller
Attorneys.

Patented Oct. 15, 1929

1,731,567

UNITED STATES PATENT OFFICE

JESSE M. GILBERT AND MARK E. BROOKSHIRE, OF LOS ANGELES, CALIFORNIA

WASHBASIN EQUIPMENT FOR AUTOMOBILES

Application filed February 15, 1928. Serial No. 254,458.

This invention relates to automobile accessories, and has for an object the provision of a complete lavatory equipment normally concealed within one of the doors of an automobile, but which is readily accessible for immediate use at any time.

With the foregoing and other objects in view which will be made manifest in the following detailed description and specifically pointed out in the appended claim, reference is had to the accompanying drawings for an illustrative embodiment of the invention, wherein:

Figure 1:
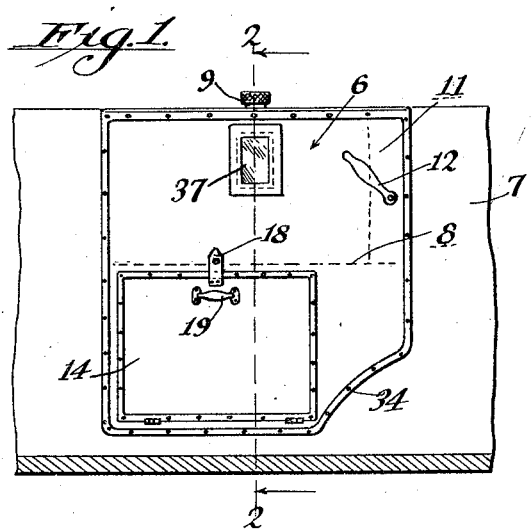
Figure 1 is an elevation of a portion of the inside of the tonneau of an automobile and one of the rear doors, showing the manner in which our lavatory equipment is concealed therein.

In terms of broad inclusion, our invention contemplates the provision of a reservoir for the reception of water; and a compartment concealed within one of the doors of an automobile, the compartment being arranged to receive a complete lavatory equipment. A conduit is provided leading from the reservoir into the compartment, and a valve permits drawing water from the reservoir.

In greater detail, the device of our invention is adapted to be incorporated with a door 6 of an automobile, the tonneau of which is indicated at 7. In its preferred embodiment, the equipment includes a reservoir 8 concealed within the top of the door 6, and having a filling cap 9 extending through the top of the door through the expedient of which the reservoir 8 may be filled with water. The reservoir 8 is of less width than the door 6, leaving a space 11 for the accommodation of the latching mechanism 12 by means of which the door 6 is retained in closed position.

A basin compartment 13 is provided in the door 6 below the reservoir 8; and a closure 14 for the compartment 13, is hinged along its bottom edge to the door so that the closure 14 may optionally be swung to closing position or opened to permit access to the compartment 13. A chain 16 or its equivalent, is provided to support the closure 14 in a horizontal plane when opened, so that it may be used as a shelf to support the basin 17 forming a portion of my lavatory apparatus. A snap or similar catch 18 is provided to retain the closure 14 closed; and the handle 19 is carried by the closure to facilitate its opening.

Figure 2:
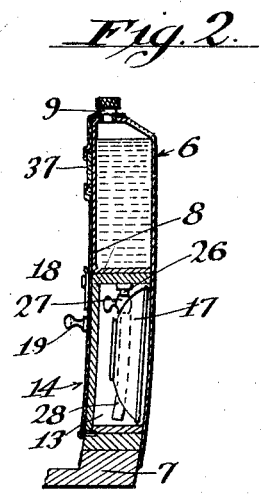
Fig. 2 is a vertical, transverse, sectional view, the plane of section being taken upon the line 2—2 of Fig. 1 in the direction of the arrows.
Figure 3:
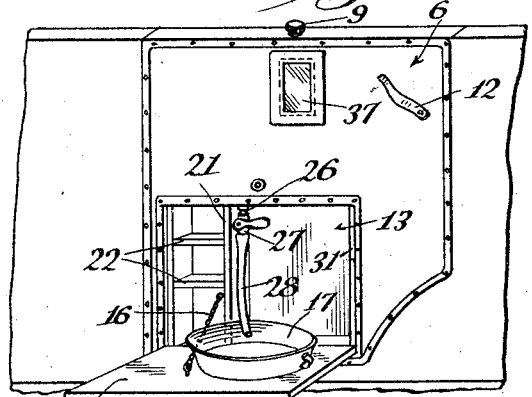
Fig. 3 is a perspective view of the structure shown in Fig. 1, showing the closure for the equipment compartment open, and the wash basin positioned thereupon for use.

A partition 21 extends vertically of the compartment 13, and preferably a plurality of shelves 22 are mounted between the partition 21 and one of the side walls of the compartment 13 for the reception of toilet articles and the like. The basin 17 is of such size as to be conveniently received within that portion of the compartment 15 between the partition 21 and the other wall of the compartment, as indicated in Fig. 2. A conduit 26 extends downwards from the reservoir 8 into the compartment 13; a faucet 27 being carried at the lower end of the conduit 26. A flexible conduit 28 such as a length of rubber hose, is secured to the outlet of the faucet, facilitating filling the basin 17 from the reservoir 8.

A closure 31 is in one of the walls of the basin compartment 13, this closure being provided with a spring-pressed hinge 32 normally retaining the closure 31 in closed position, but permitting access to an auxiliary compartment 33 alongside the basin compartment 13. This auxiliary compartment 33 utilizes the space over the curved portion 34 with which the rear doors of most automobiles are provided. A spring snap 36 is secured to the wall of the basin compartment 13 below the closure 31 to resiliently retain the basin 17 in place when not in use; it being understood that one side of the basin is engaged behind the flexible conduit 28 and the other side behind the clip 36. A mirror 37 may be positioned upon the interior of the door 6 as clearly shown in Figs. 1, 2, 3, and 4.

It is believed that the manner of operation of our improved lavatory equipment for automobiles is altogether obvious; and it is readily understood that the inclusion of such an equipment within the door of an automobile, will afford instantly available means for arranging a person's toilet.

Figure 5:
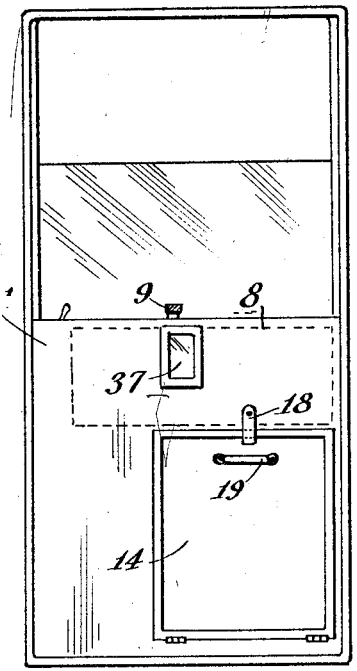
Fig. 5 is an elevation of a modified form of our invention, showing the manner of applying it to the door of a sedan.
Figure 4:
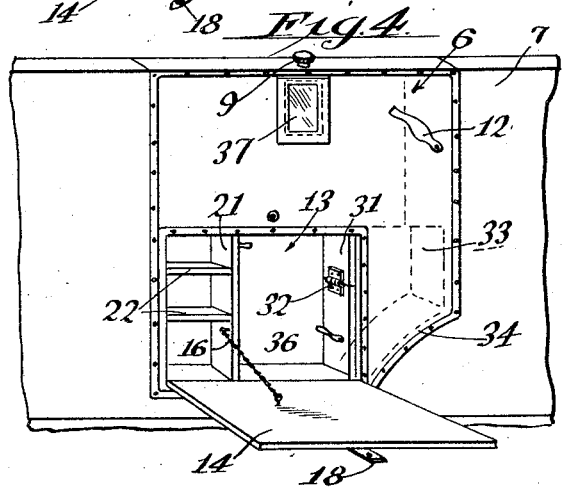
Fig. 4 is a perspective view similar to Fig. 3, but with the wash basin removed and showing an auxiliary compartment in dotted lines.

In Fig. 5, a slightly modified form of the invention is shown, wherein the water reservoir 8, basin compartment 13, closure 14 therefor, and other details of the equipment, are precisely the same as those previously described, but wherein the apparatus is shown applied to a door 6' of a sedan.

Various changes in the details of construction may be made without departing from the spirit and scope of the invention as defined by the appended claim.

We claim:

A lavatory equipment for automobiles comprising in combination with an automobile door, a reservoir concealed within said door, a filling cap on said reservoir accessible from the exterior of the door, a compartment within said door below said reservoir, a basin removably receivable within said compartment, a closure for said compartment pivoted along its lower edge to said door, means for retaining said closure closed, a support for retaining said closure in a horizontal plane when open to provide a shelf, a conduit leading from said reservoir into said compartment, a faucet in said conduit, a shelf rigidly secured within said compartment, and an auxiliary compartment accessible through one of the walls of said basin compartment.

In testimony whereof we have signed our names to this specification.

JESSE M. GILBERT.
MARK E. BROOKSHIRE.